United States Patent [19]

Brambach

[11] Patent Number: 5,043,127
[45] Date of Patent: Aug. 27, 1991

[54] METHOD OF MAKING A SHAPED ARTICLE FROM A SANDWICH CONSTRUCTION

[75] Inventor: Johan A. Brambach, Leiden, Netherlands

[73] Assignee: Schreiner Luchtvaart Groep B.V., Leiden, Netherlands

[21] Appl. No.: 590,687

[22] Filed: Oct. 1, 1990

Related U.S. Application Data

[63] Continuation of Ser. No. 343,337, Apr. 26, 1989, which is a continuation-in-part of Ser. No. 110,793, Oct. 21, 1987, abandoned.

[30] Foreign Application Priority Data

Oct. 22, 1986 [EP] European Pat. Off. ........ 86201850.4

[51] Int. Cl.⁵ .............................................. B29C 43/20
[52] U.S. Cl. .................................. 264/257; 264/258; 264/322; 264/324
[58] Field of Search ............ 428/246, 253, 286, 304.4, 428/316.6, 419, 473.5; 264/257, 258, 45.1, 45.5, 321, 322, 324, 325, 319; 156/62.2, 245, 290, 273.3

[56] References Cited

U.S. PATENT DOCUMENTS

| | | | |
|---|---|---|---|
| 3,037,897 | 6/1962 | Pelley | 264/321 |
| 3,396,062 | 8/1968 | White | 264/321 |
| 3,528,866 | 9/1970 | Stevens | 156/220 |
| 3,841,958 | 10/1974 | Delorme | 428/318.6 |
| 3,906,137 | 9/1975 | Bauer | 428/313 |
| 4,331,725 | 5/1982 | Akao | 428/138 |
| 4,476,183 | 10/1984 | Holtrop | 428/286 |
| 4,543,289 | 9/1985 | Park | 428/304.4 |
| 4,889,763 | 12/1989 | Brambach | 428/246 |

FOREIGN PATENT DOCUMENTS

| | | |
|---|---|---|
| 0146519 | 6/1985 | European Pat. Off. . |
| 0264495 | 4/1988 | European Pat. Off. . |
| 2545700 | 4/1977 | Fed. Rep. of Germany . |
| 2906259 | 8/1980 | Fed. Rep. of Germany . |
| 3419142 | 11/1985 | Fed. Rep. of Germany . |
| 1362035 | 4/1964 | France . |
| 2028134 | 10/1970 | France . |
| 2130111 | 11/1972 | France . |
| 2192905 | 2/1974 | France . |
| 2198835 | 4/1974 | France . |
| 936232 | 9/1963 | United Kingdom . |
| 1262882 | 2/1972 | United Kingdom . |
| 2147850 | 5/1985 | United Kingdom . |

Primary Examiner—Jay H. Woo
Assistant Examiner—Jeremiah F. Durkin, II
Attorney, Agent, or Firm—Burns, Doane, Swecker & Mathis

[57] ABSTRACT

A method of making a shaped article from at least one integrated multi-layered sheet having excellent mechanical properties and being light in weight, which includes the steps of providing a thermoplastic synthetic material reinforced by a fiber mat on at least one side of a substantially flat sheet of thermoplastic synthetic foam having a homogeneous structure, the fiber mat, thermoplastic synthetic material and sheet of synthetic foam being integrated under the influence of elevated temperature and increased pressure, providing deformability by entirely or locally heating the resulting integrated fiber reinforced sheet, giving the heated sheet the desired structure and shape, and fixing the article by cooling. The invention also includes a process starting from a sheet of a thermoplastic foam having a homogeneous structure having attached thereto at least one fiber mat impregnatd with a thermoplastic synthetic material, which includes the steps of providing deformability by entirely or locally heating the resulting integrated fiber reinforced sheet, giving the heated sheet the desired structure and shape, and fixed the article by cooling.

9 Claims, 1 Drawing Sheet

METHOD OF MAKING A SHAPED ARTICLE FROM A SANDWICH CONSTRUCTION

CROSS REFERENCE TO RELATED APPLICATION

This application is a continuation of application Ser. No. 07/343,337, filed Apr. 26, 1989 which is a continuation-in-part of application Ser. No. 110,793 filed Oct. 21, 1987 now abandoned.

BACKGROUND OF THE INVENTION

1. Field of the Invention

This invention relates to a method of making a shaped article from one or more integrated multi-layered sheets.

2. Description of the Related Art

Especially for use in transport means, such as aircraft, automobiles and trains, a search has long been made for materials which are both light in weight and possess high stiffness, impact resistance and strength. In this regard, it has heretofore been proposed to make sandwich constructions consisting of a completely or partly hollow core having provided thereon a fibrous synthetic layer. Such sandwich constructions possess clear advantages with regard to mechanical properties and weight when compared with massive materials. A commercially sold product consists of, e.g., a honeycomb structure having provided on its surface a thin fibrous layer.

Although the prior art sandwich constructions possess clear advantages from a viewpoint of mechanical properties, in practice they are rather difficult to shape, especially where there is a great deal of variation in shape or where the shape is very complex. In such cases, very difficult and time-consuming operations are required, and often times the desired form cannot in fact be made.

It is proposed in Canadian patent 1,184,106 to use a sandwich material consisting of a core of a foam material having provided on its two surfaces a layer consisting of a fibrous structure impregnated with a mixture of epoxide and hardener being in the B-stage. This material can be shaped in a mold or press and hardened to obtain a product having the desired form.

With this type of material the problem occurs that the deformation can take place only once and is not reversible. Consequently, it is not possible to shape a standard panel or reshape another article to specific forms, requirements or situations. In addition, thermosetting materials such as epoxy are susceptible to aging, resulting in deterioration in physical properties over time. There is thus a need in the art for a structural material which is light in weight, possesses good mechanical properties, and is capable of undergoing multiple deformations.

SUMMARY OF THE INVENTION

It is accordingly an object of the invention to provide a method of making a shaped article from at least one integrated multi-layered sheet, whereby the multi-layered sheet is resistant to aging.

It is another object of the invention to provide a method, as above, which permits the use of a simple mold for forming the multi-layered sheet.

It is yet another object of the invention to provide a method, as above, whereby the multi-layered sheet is capable of undergoing multiple deformations.

These objects, and others, are achieved by a method of making a shaped article from at least one integrated multi-layered sheet, which comprises the steps of providing a thermoplastic synthetic material reinforced by a fiber mat on at least one side of a substantially flat sheet of thermoplastic synthetic foam having a homogeneous structure, the fiber mat, thermoplastic synthetic material and sheet of synthetic foam being integrated under the influence of elevated temperature and increased pressure, providing deformability by entirely or locally heating the resulting integrated fiber reinforced sheet, giving the heated sheet the desired structure and shape, and fixing the article by cooling.

Another embodiment of the invention comprises a method of making a shaped article from a sandwich construction consisting at least of an integrated multi-layered sheet formed by a sheet of a thermoplastic foam having a homogeneous structure, and having attached thereon at least one fiber mat impregnated with a thermoplastic synthetic material, which comprises the steps of providing deformability by entirely or locally heating the resulting integrated fiber reinforced sheet, giving the heated sheet the desired structure and shape, and fixed the article by cooling.

BRIEF DESCRIPTION OF THE DRAWING

For a full understanding of the true scope of the invention, the following detailed description should be read in conjunction with the drawing, wherein.

DETAILED DESCRIPTION OF THE PREFERRED EMBODIMENT

Surprisingly, it has been found that the invention as defined by the method described above does not have the drawbacks of the prior art. A suitable selection of the materials leads to a product having excellent mechanical properties and being very light in weight.

An important advantage of the product according to the invention is that this product is chemically stable, unlike prior art materials utilizing thermosetting synthetics. This means that the product is not susceptible to aging, and therefore mechanical properties will not decline in the course of time.

The sandwich construction obtained using the method according to the invention can be further shaped after manufacture by repeating the deforming operation according to the invention, e.g., for the purpose of accommodation to specific situations departing from the standard, but also for providing places of attachment without the occurrence of mechanical weakening. In the products obtained according to the invention, an additional layer of fiber reinforced synthetic material can in fact be provided without connecting means on the surface which will form one integrated whole therewith so that an integrated local reinforcement is obtained, e.g., around a point of attachment.

It is observed that the terms "structure and shape", as used herein, can relate not only to the physical change of the form of the sheet but also to, e.g., adaptions of the sheet in order to meet specific requirements, such as local reinforcement, which do not immediately give rise to a change of the form. The term "homogeneous structure" is used to denote the fact that the foam sheet consists of a continuous, integral material that has not been prepared from sintered beads, such as described in U.S. Pat. No. 3,037,897 to Pelley. The use of material having a homogeneous structure as defined herein is of importance to maintain the excellent mechanical properties after shaping.

According to a preferred embodiment of the invention, the shaping steps can be performed on a sheet formed from a thermoplastic synthetic foam provided on one side with a layer of fiber reinforced thermoplastic synthetic material. In a simple mold, this so-called half sandwich can then be shaped to the desired final form.

Figure 1:
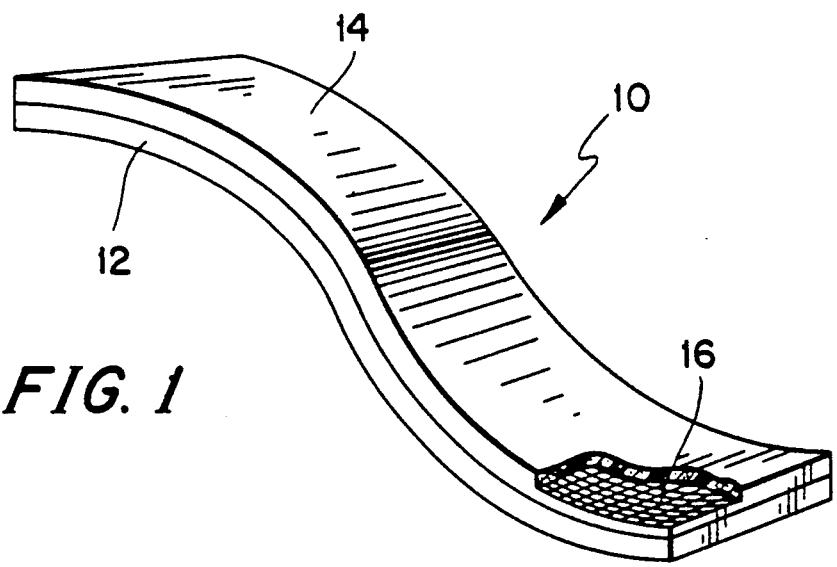
FIG. 1 is an integrated multi-layered sheet in partial cross-section, constructed in accordance with one embodiment of the invention.

Such a construction is illustrated in FIG. 1, wherein a shaped article formed from a multi-layered sheet is indicated generally by the number. 10 A layer of thermoplastic synthetic foam 12 has provided on one side thereof a layer of thermoplastic synthetic material 14. Shown in partial cross-section is a fiber reinforcement material 16 which in a preferred embodiment comprises a woven material as shown, having weft and weave strands.

Figure 2:
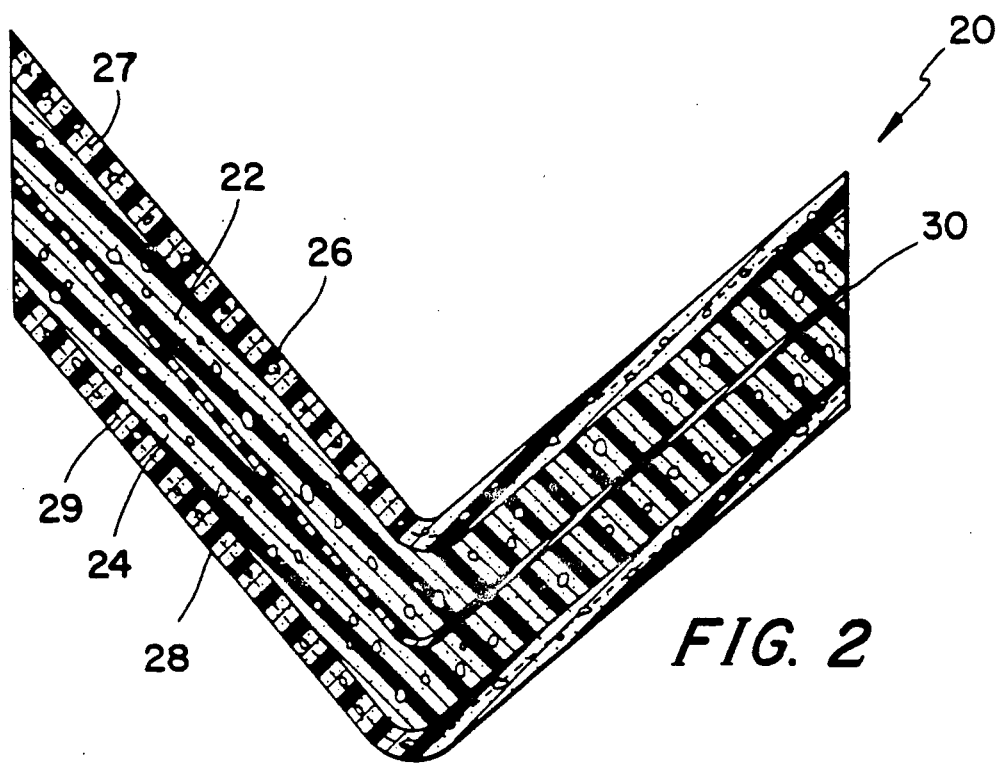
FIG. 2 is a cross-sectional view of an integrated multi-layered sheet constructed in accordance with a second embodiment of the invention.

In a second embodiment, by using varying accessories, it is possible in the same mold to make a mirror-inverted halflaminate, and to bond the two separately formed sheets together via the uncoated surfaces of the thermoplastic synthetic foam. If desired, an optionally fibrous core of thermoplastic synthetic material, e.g., a carbon fiber-containing synthetic film, may be interposed between these two sheets. This is illustrated in FIG. 2, wherein this second embodiment is indicated generally by the number 20. Thermoplastic synthetic foam layers 22 and 24 each have provided on their outer sides a layer of fiber reinforced thermoplastic material 26 and 28 having reinforcements 27 and 29. Synthetic film 30 is positioned between the synthetic foam layers 22 and 24.

Bonding may also be effected by means of glue or adhesive tape, if so desired. This last adhesive step, too, may be performed in the same mold. It will be clear that such a method makes a great saving in the required equipment. Moreover, the time required for shaping is very short when compared with prior art methods.

The method according to the present invention offers clear advantages over the use of thermosetting materials. In the first place, the product obtained according to the present invention has greater flexibility resulting in a lower risk of hair cracks. By contrast, at high load thermosetting materials may exhibit hair cracks, especially after aging, resulting from the elongation in the reinforcing fibers, so that moisture and dirt can penetrate into the fibers or the core.

Moreover, the quality of the material is very reproducible, since the semifinished product, i.e., the sandwich sheet, can be manufactured on an industrial scale under controlled conditions, with the result that the final product is less dependent on the manual skill of the person manufacturing the product. This results in less spoilage. In addition, no expensive and complicated equipment is required for fixing the form.

An important advantage of the present invention is that both the semifinished product and the final product are chemically stable, i.e., they are not or substantially not susceptible to aging. Thermosetting materials, on the other hand, have the drawback that a reaction continuously takes place resulting in aging. This problem occurs not only in the final product, but also in the semifinished product in which the epoxy/hardener mixture is in the B-stage. The production and storage of prior art thermosetting semifinished products thus requires very close attendance, because even after a rather short time, the hardening reaction proceeds to the extent that the semifinished product is no longer useful.

According to a preferred embodiment of the invention, it is very easy to make edge connections between two sheets. In fact, the sheets to be connected can be easily bonded together by applying heat. A suitable selection of temperature, pressure and shaping can result in a connection showing no appreciable thickening, to wit: when the sheets are superimposed in the longitudinal direction of partially overlapping condition and then pressed together by applying heat, there is obtained, by melting the synthetic foam at the joint, a connection having substantially the same thickness as the sheets themselves.

The materials to be used for the present invention may be the well-known thermoplastic synthetic foams, in which respect imide foams, such as polyetherimide foam, polymethacrylimide foam and polyethersulfone foam are preferred, especially from the viewpoint of stiffness, strength and temperature resistance. Polyetherimide and polyethersulfone are especially preferred.

The thermoplastic synthetic material used for bonding the sheets together, and for the surface layers, is in general polyetherimide, polycarbonate, polyethersulfone, polyetherketone, or polyether-etherketone. Subject to the desired temperature and chemical resistance, however, other synthetics well known to those skilled in the art may also be used.

The fiber reinforcement optionally incorporated in the thermoplastic synthetic material may consist of glass fibers, carbon fibers, aramide fibers and the like. These fibers may be arbitrarily oriented, oriented in one direction or oriented in two or more directions. It is preferred that the fibers are oriented in two directions (i.e., weft and weave pattern), using in particular a woven fabric having longer fibers. These fibers preferably have a length corresponding to the length of the sheet because this will lead to the best mechanical properties. It is also possible to use a composite consisting of rather short fibers having properties which, owing to the mode of processing, are comparable to "endless" long fibers.

An important advantage of the shaped articles using the method according to the invention, especially when using fiber reinforcement in the form of fabrics, is that the sheets have excellent flame retardant properties.

The foam material has to have a homogenous structure, which means that the foam material can be prepared in a number of ways. It is for example possible to prepare a foamable sheet material of the thermoplastic and foaming this sheet material by heating. It is also possible to extrude a foamable mixture of thermoplastic material and foaming agent. The mixture immediately foams upon extrusion. The thus prepared foamed material can subsequently be given the desired size by cutting. This material is then used as the starting material for the sandwich construction.

The method according to the invention can be carried out in a number of separate steps. The first step comprises providing a thermoplastic synthetic material reinforced by a fiber mat on the thermoplastic synthetic foam sheet. Preferably, a pre-impregnated fiber mat is started from, but it is also possible to start from a fiber mat and a synthetic material separated therefrom, the fiber mat being impregnated during manufacture. The sheet used is preferably substantially flat, because it is most easy then to carry out the method. Bonding of the pre-impregnated fiber mat to the synthetic foam may be effected in various ways, but elevated temperature and increased pressure are always used. However, in order to obtain optimum bonding additional steps may be taken, depending on the types of thermoplastic synthetic material.

In case of using, e.g., a methacrylimide synthetic foam in combination with a fiber mat impregnated with polyetherimide or polycarbonate, an additional non-fibrous film is preferably interposed between the foam and the fiber reinforced synthetic material, preferably in combination with rather shallow grooves in the synthetic foam. By applying heat and pressure there is obtained optimum bonding of the fibrous synthetic film to the foam. However, it is also possible to provide only shallow grooves on the foam or to use only an additional film. Also, one of these variants may be combined using a softener which, prior to bonding, is provided on one or both surfaces to be bonded together. Such a softener preferably consists of a solvent for the synthetics used, if required having dissolved therein an amount of the synthetic material used for the film. In this connection thought may be given to dichloromethane, etc.

In case of using a synthetic foam core having the same chemical composition as the synthetic material of the fiber reinforced film, it is in general not necessary to promote bonding by taking special steps. It may be advantageous indeed to apply a slight amount of softener, but other steps seem superfluous in general.

The temperatures used in the various operations are entirely dependent on the materials used. In this connection it is also important that both the foam and the fibers used substantially do not melt, unless this is exactly intended, e.g., for the foam: in general, while duly observing the above-mentioned limiting conditions a temperature ranging from 80° to 350° C. will be maintained during operations requiring heat for providing deformability by heating the thermoplastic synthetics used.

Heating may be effected in a conventional manner, e.g., by means of radiation or hot air. In specific situations induction heating can be applied already.

After shaping the article is cooled to below the softening point of the lowest softening synthetic material. After optionally repeated heating, shaping and cooling, the article is generally cooled to room temperature, or to the service temperature of the article.

In the manner as described above there is obtained a semifinished product consisting of a synthetic foam sheet on one or both sides of which a fiber reinforced film is provided. This semifinished product can be directly shaped further in the manner according to the invention, but it is also possible to store this semifinished product and to shape it only in a much later stage. In this connection the invention also relates to the further processing of a semifinished product made in a previous stage in the manner described above.

The second and following steps of the invention therefore always comprise the heating and shaping of said semifinished product in which it is not necessary then to obtain the final form in one shaping step. Especially in the manufacture of very complicated articles this means that the shaping operation can be divided into several separate steps, which has a favorable effect on the cost, while also the extent to which the final produce satisfies the specifications can be greater. More in particular, it is also possible to correct small deviations later, if required.

In this connection it is also important that larger series of identical products can be produced rather easily whereby individual specimen are adapted to specific conditions later on the spot. In this connection thought may be given to, e.g., aircraft wall panels, of which one or two out of 100 panels must have a slightly different form or a number of additional recesses. These last different sheets can be easily shaped from the standard sheets.

The invention will now be illustrated by means of several examples, but is not restricted thereto.

EXAMPLE 1

A sandwich constructions consisting of a 4.8 mm thick polymethacrylimide foam and two outer layers of aramide fabric impregnated with polyetherimide was made by providing surfaces of the foam with shallow grooves and applying thereto on both sides an aramide fabric impregnated with polyetherimide, by means of heat and pressure. The surface of the film was softened by means of methylene chloride having dissolved therein 5% by weight of polyetherimide.

The thickness of the total construction was 5.0 mm, and the weight was 654 g/m$^2$.

The tensile strength was 429 MPa, the E modulus was 19 GPa an the elongation at break 2.3%.

The compression tests gave a compressive strength of 35.5 MPa and an E modulus of 5.5 GPa. The bending strength was $33 \times 10^4$ N mm$^2$/cm (ASTM C 393-62).

The resulting laminate was heated by means of radiation to a temperature (measured at the surface of the fiber reinforced synthetic material) of 300° C., after which the sandwich construction was reduced to the desired form. After cooling to room temperature there was obtained an article having a fixed form and showing no aging, with no substantial alteration of the mechanical properties. The resulting product could be made deformable by means of heating.

EXAMPLE 2

In the same manner as described in Example 1, a sandwich construction was made using a glass fiber web instead of an aramide fabric.

The mechanical properties of an article formed from such a sandwich construction were as follows:

| | |
|---|---|
| weight | 754 g/m$^2$ |
| E modulus top layer | 23,000 N/mm$^2$ |
| tensile strength | 1,070 N/mm$^2$ |
| bending strength | 360,000 N/mm$^2$/cm |

EXAMPLE 3

Example 1 was repeated using a carbon fiber web instead of an aramide fabric.

The results were as follows:

| | |
|---|---|
| weight | 1082 g/m$^2$ |
| E modulus top layer | 74,000 N/mm$^2$ |
| tensile strength | 1000 N/mm$^2$ |

| | |
|---|---|
| -continued | |
| bending strength | 870,000 N/mm²/cm |

What is claimed is:

1. A method of making a shaped article from at least one integrated multi-layered sheet, which method comprises the steps of:
   (a) providing a coating of a thermoplastic synthetic material reinforced by a fiber mat on at least one side of a substantially flat sheet of a continuous, integral thermoplastic synthetic foam having a homogeneous structure, said fiber mat, thermoplastic synthetic material and sheet of synthetic foam being integrated under the influence of elevated temperature and increased pressure;
   (b) heating at least a portion of the resulting integrated fiber reinforced sheet, and giving the heated sheet the desired structure and shape by deformation; and
   (c) fixing the article by cooling; wherein the structural integrity of the shaped article is substantially unaffected by the deformation.

2. A method according to claim 1, wherein two separately formed sheets each provided on one side with a fiber mat are bonded together with the uncoated side.

3. A method according to claim 2, wherein bonding is effected using an fibrous core of thermoplastic synthetic material.

4. A method according to claim 1, wherein the steps of heating, shaping and/or cooling are repeated at least once.

5. A method of making a shaped article from a sandwich construction consisting at least of an integrated multi-layer sheet formed by a sheet of an integral thermoplastic foam having a homogeneous structure and having attached thereto at least one fiber mat impregnated with a thermoplastic synthetic material, comprising the steps of:
   (a) heating at least a portion of the resulting integrated fiber reinforced sheet, and giving the heated sheet the desired structure and shape by deformation; and
   (b) fixing the article by cooling; wherein the structural integrity of the shaped article is substantially unaffected by the deformation.

6. A method according to claim 5, wherein after heating and shaping, two sheets each provided on one side with a fiber mat are bonded together with the uncoated sides.

7. A method according to claim 6, wherein bonding is effected using a core of thermoplastic synthetic material.

8. A method according to claim 5, wherein the steps of heating, shaping and/or cooling are repeated at least once.

9. A method according to claim 6, wherein the core is fibrous.

* * * * *